Patented Aug. 3, 1948

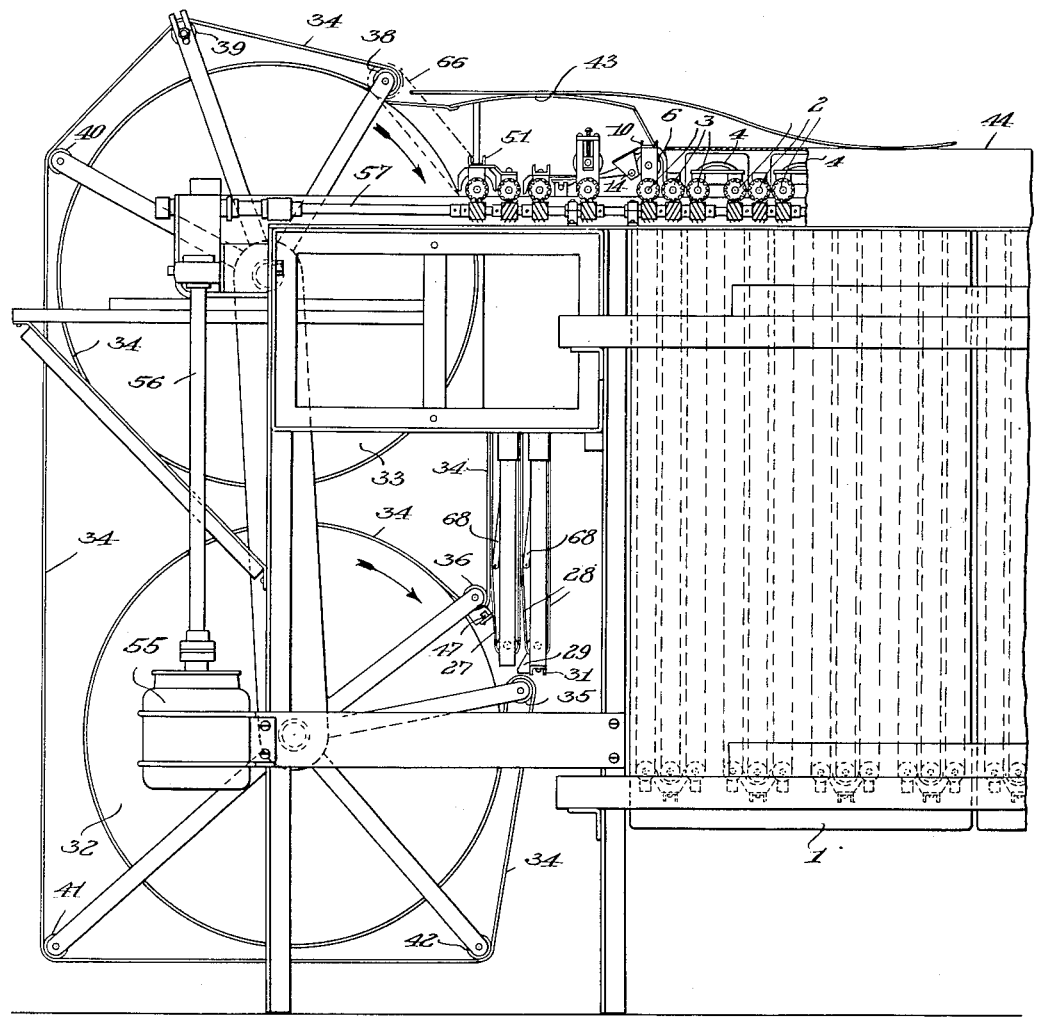

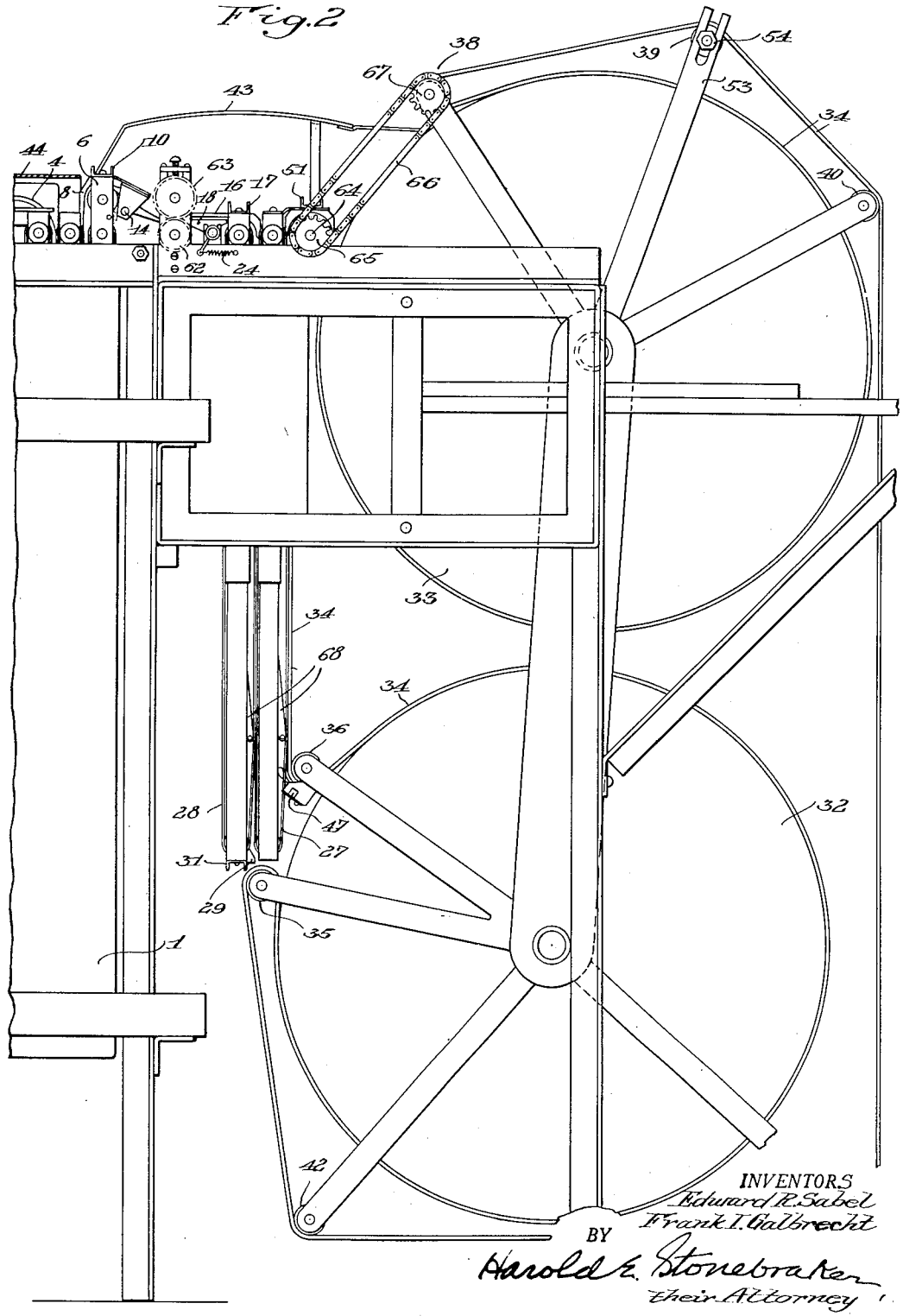

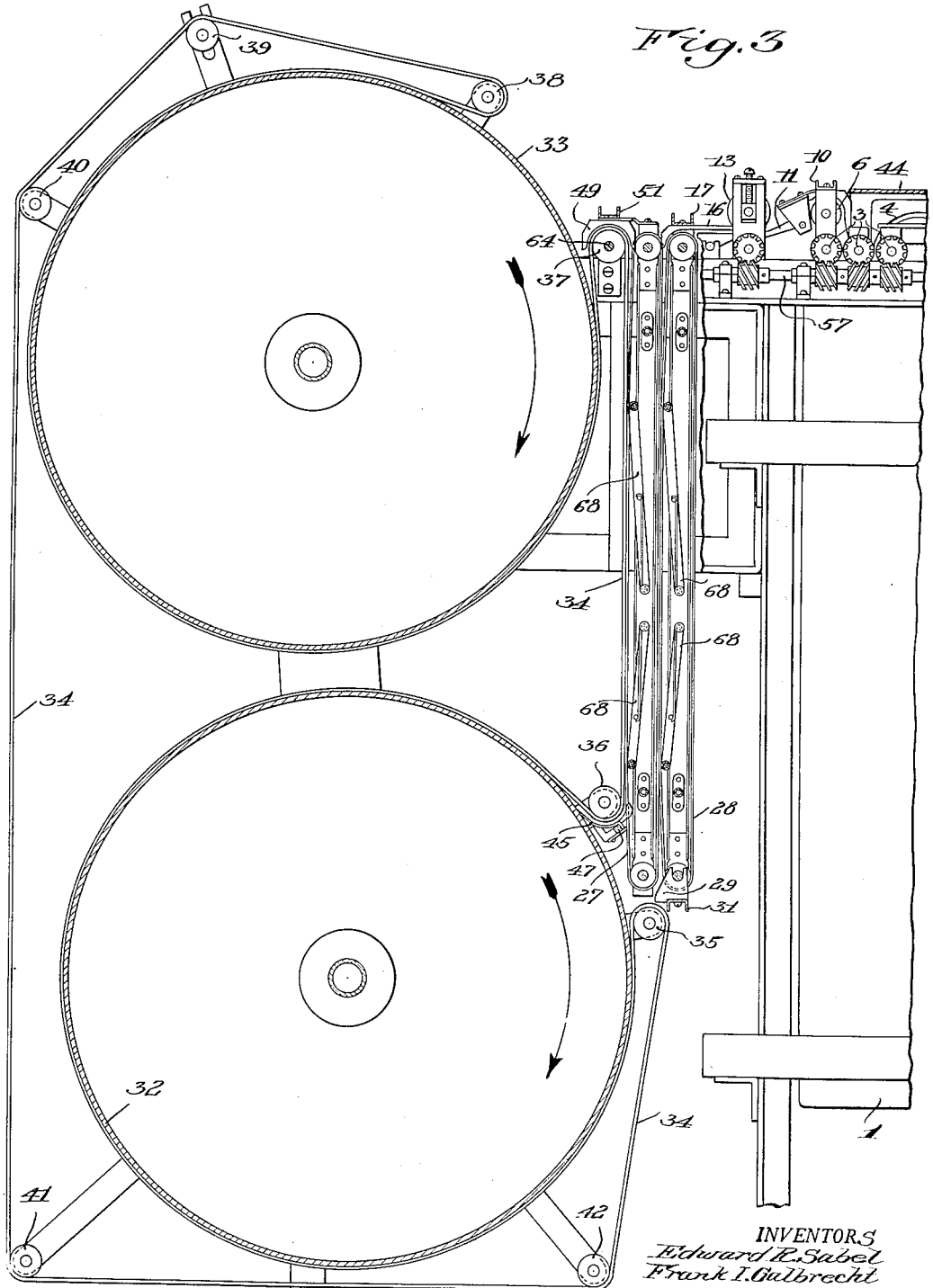

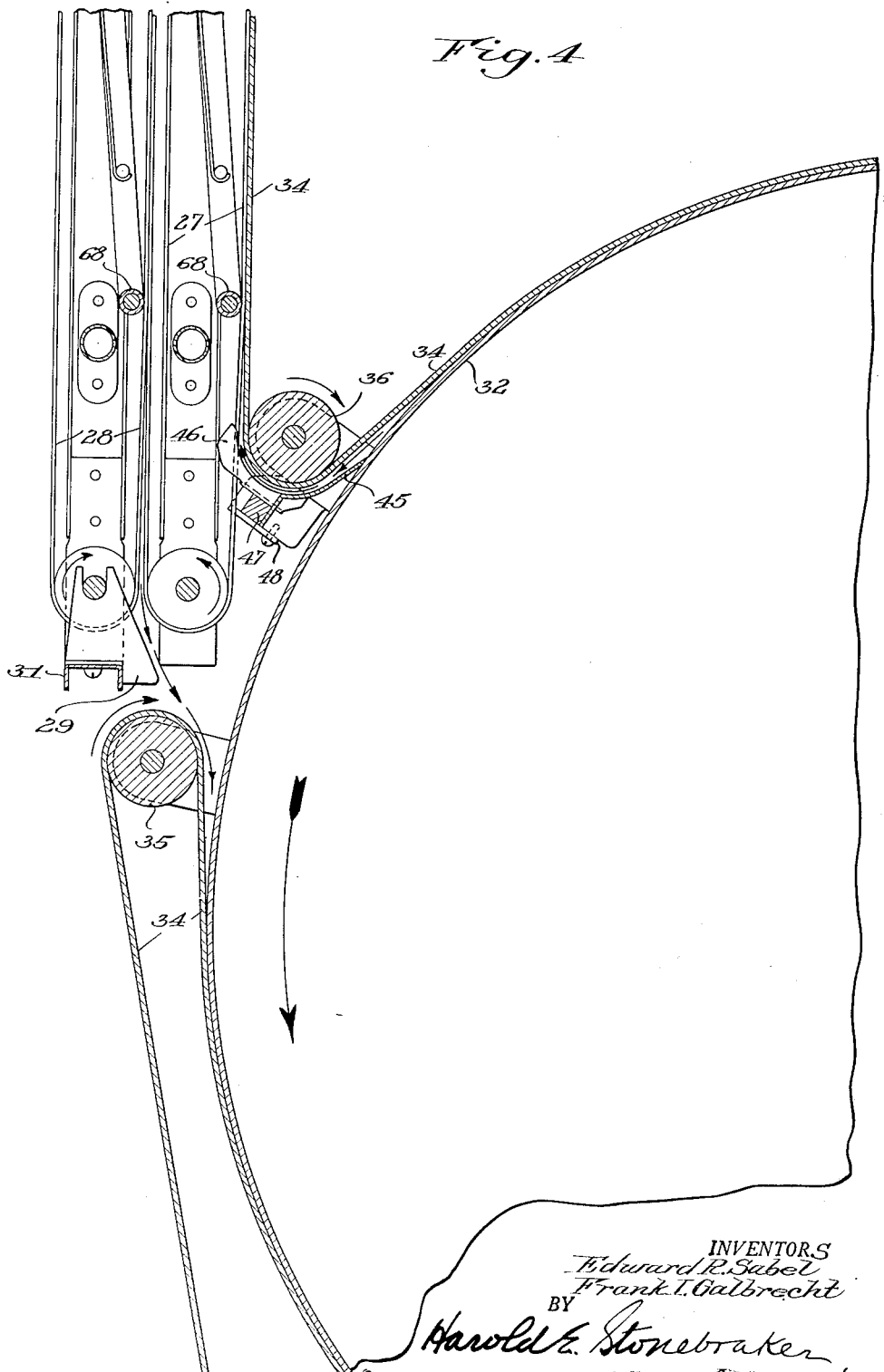

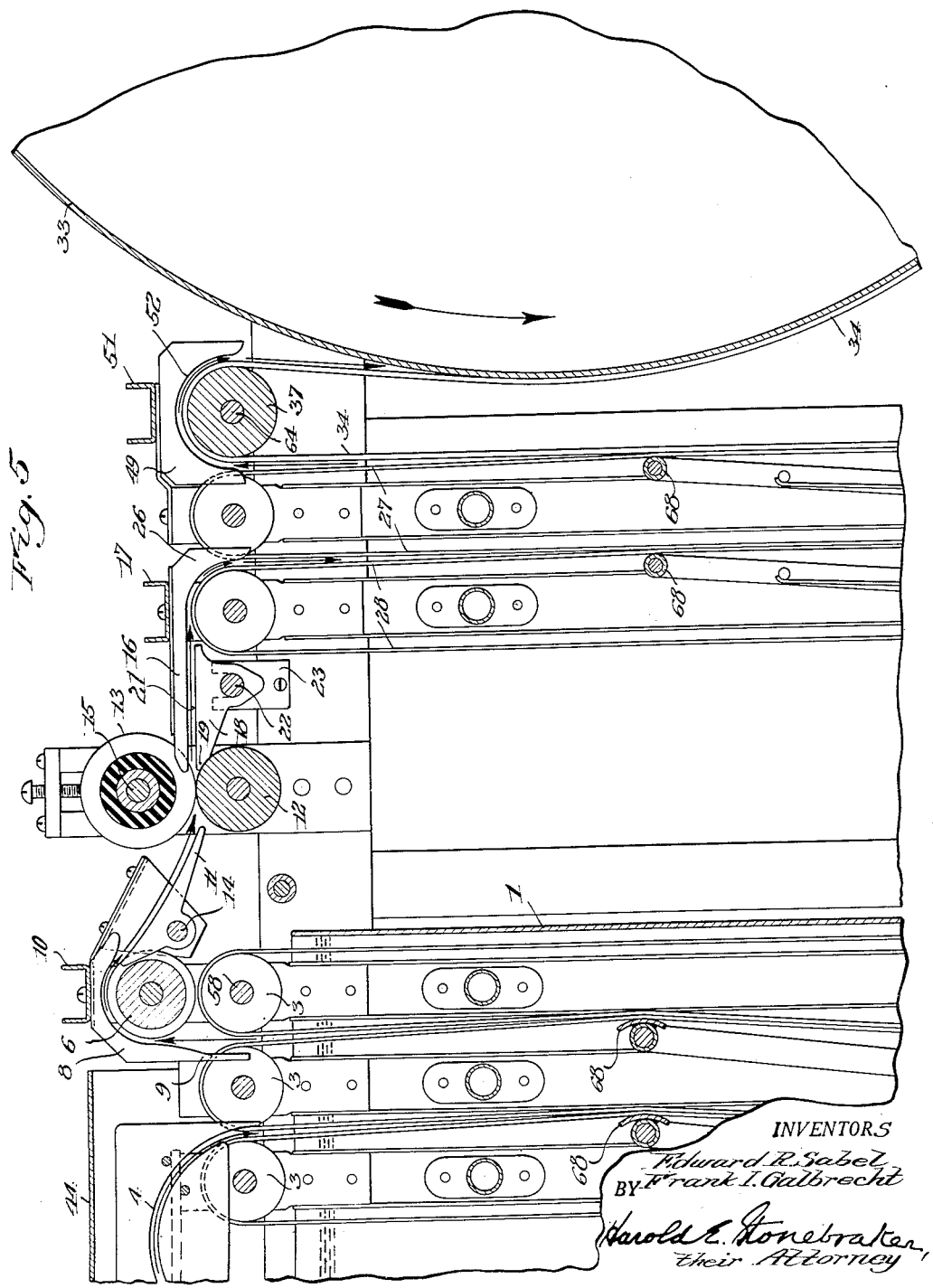

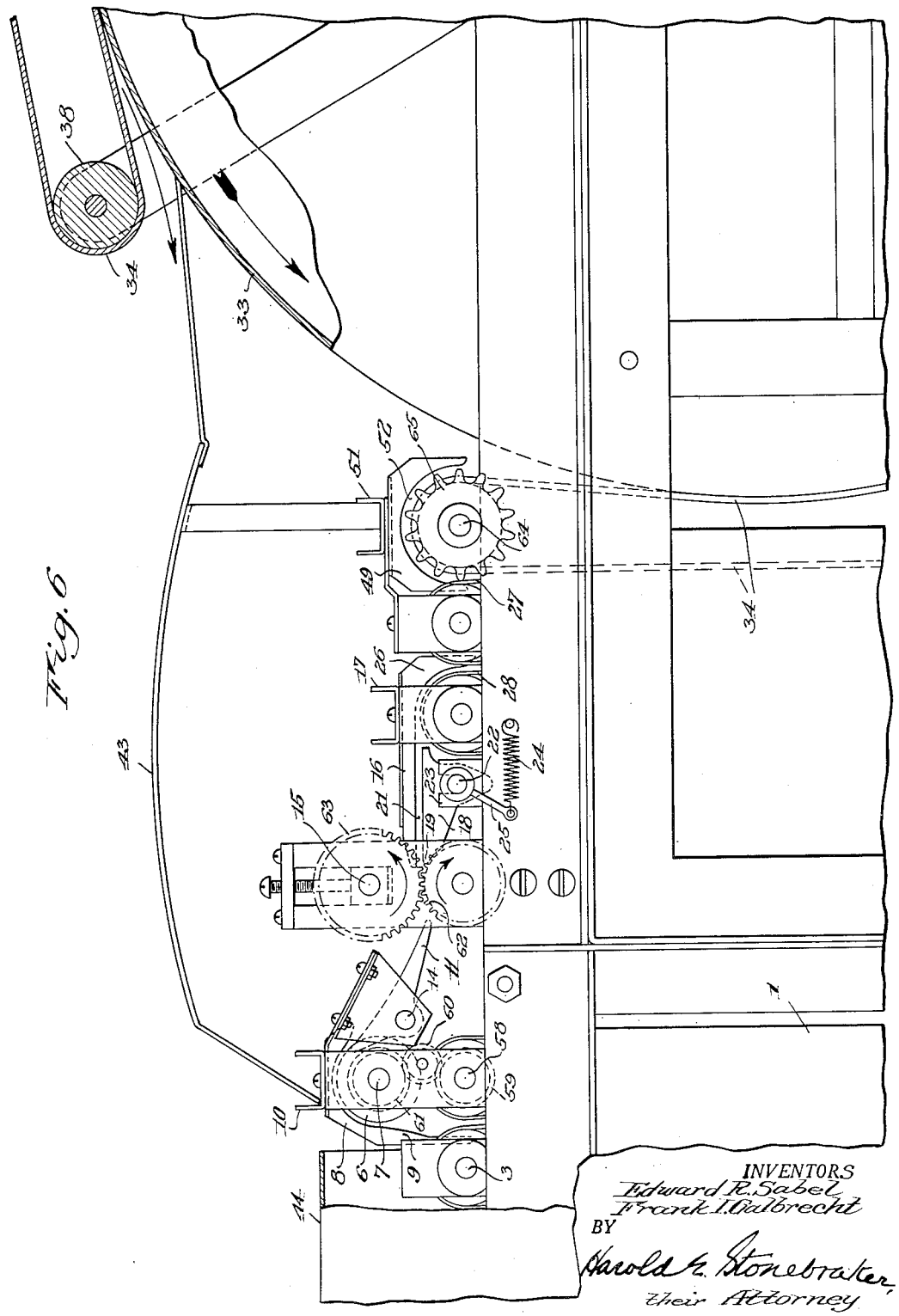

2,446,246

UNITED STATES PATENT OFFICE 2,446,246

PHOTOCOPY MACHINE

Edward R. Sabel and Frank I. Galbrecht, Rochester, N. Y., assignors to The Haloid Company, Rochester, N. Y., a corporation of New York Application September 3, 1946, Serial No. 694,620

8 Claims. (Cl. 34—70)

This invention relates to a photocopy machine of the general character employed for making photographic copies of records such as drawings, documents, pages of books and the like, in which prints are continuously processed immediately after exposure, and dried, and has for its purpose to afford improved means for drying the prints efficiently, thoroughly, and uniformly after processing.

More particularly, the invention has for its purpose to provide simple and efficient mechanism occupying a minimum floor space, which can be easily serviced and maintained continuously in operation, and which removes all liquid and thoroughly dries paper prints in a most efficient way so that they are delivered from the machine in a smooth, unwrinkled state, to produce copies of high quality.

Still a further purpose of the invention is to afford mechanism that enables drying paper prints gradually and uniformly by subjecting them to a lower temperature when in their wettest state and to a higher temperature when in a drier state, while at the same time feeding the prints through the drying apparatus at a speed equal to that at which they are conveyed through the processing mechanism, resulting in a machine of maximum speed and capacity.

An additional object of the invention is to afford structure that employs a plurality of superposed rotatable heating drums and a continuous drum conveyor belt engaging the peripheries of both drums and operable to move prints successively around lower and upper drums, thus enabling different temperatures in the two drums and facilitating the adjusting and servicing of a single drum conveyor belt which insures uniform travel of the prints around the drums.

Another purpose of the invention is to provide means that insures evening or smoothing the paper prints after they leave the processing mechanism and before engagement by wringer rolls, so that when the prints leave the wringer rolls and enter the drying mechanism, they are in a perfectly smooth state free from all creases, wrinkles, or like imperfections.

Another object of the invention is to afford practical, simple, and efficient means for conveying paper prints from wringer rolls to the inlet point of the lower drum of the drying mechanism, a portion of the feeding means being arranged to cooperate with the drum conveyor belt to feed prints from the exit point of the lower drum to the inlet point of the upper drum of the drying mechanism.

To these and other ends, the invention consists in the construction and arrangement of parts that will appear clearly from the following description when read in conjunction with the accompanying drawings, the novel features being pointed out in the claims following the specification.

In the drawings:

Fig. 1 is a view in side elevation showing a portion of the processing mechanism of a photocopy machine such as illustrated in copending application Ser. No. 690,983, filed August 16, 1946, together with a preferred embodiment of the drying mechanism forming the subject matter hereof;

Fig. 2 is an enlarged view in side elevation, looking in the opposite direction from Fig. 1, and showing the final group of belt-feeding units of the processing mechanism;

Fig. 3 is a vertical sectional view, looking in the same direction as Fig. 1, and showing the relation of the heating drums, the drum conveyor belt, and the belt-feeding units that carry the prints initially to the lower drum;

Fig. 4 is an enlarged sectional view looking in the opposite direction from Fig. 3, and showing the means for feeding and deflecting prints to the inlet point of the lower drum and for transferring the prints from the exit point of the lower drum to between the belts of the adjacent belt-feeding unit and the vertical portion of the drum conveyor belt, which carry the prints to the upper drum;

Fig. 5 is a vertical sectional view partially broken away looking in the same direction as Fig. 4, and showing the final group of belt-feeding units of the processing mechanism, the evener roll, the wringer rolls, the belt-feeding units that convey the prints from the wringer rolls to the lower drum, the upper drum, and drum conveyor belt, and Fig. 6 is a view in side elevation looking in the same direction as Fig. 5, and showing the drive mechanism to the several parts.

The invention is illustrated herein in connection with a photocopy processing mechanism such as disclosed in copending application Ser. No. 690,983, filed August 16, 1946, shown partially in Figs. 1, 2 and 5, and referring more particularly to the drawings in which like reference numerals refer to the same parts throughout the several views, 1 indicates the wash tank of the processing mechanism through which the prints are carried during the final washing operation after being exposed and cut off in the camera body. The prints are carried downwardly and upwardly successively through the wash tank by groups of belt-feeding units indicated at 2 and 3 respectively, see Fig. 1, each of said groups comprising three belt-feeding units consisting of a multiplicity of spaced parallel endless feeding belts traveling around pulleys mounted on shafts at the top and bottom of the belt-feeding unit, as illustrated in Reissue Patent No. 22,654, July 3, 1945, and the prints being transferred from one to another group of belt-feeding units by curved guideways 4 formed by spaced vertically arranged plates, as illustrated in the aforementioned copending application.

The subject matter thus far described forms no part of the present invention except as hereinafter indicated, the invention of this application having to do mainly with the means for evening or smoothing the wet paper prints as they issue finally from the water bath of the processing mechanism, the parts which transfer the prints thence to the drying means, and the structure and arrangement of the drying mechanism which greatly increases the speed and capacity of the apparatus and produces a high quality print on a machine occupying a minimum floor space, and which can be manufactured and serviced within reasonable cost limitations.

In order to even or smooth the wet prints as they issue from the water bath and to remove all wrinkles or creases prior to pressing out the water and drying the prints, there is provided an evener roll over the surface of which the prints are conducted. Referring to Figs. 1, 2 and 5, the evener roll is designated at 6, being mounted on a shaft 7 driven in a manner that will be described later, and consists of an annularly grooved roll of fiber, hard rubber, or other suitable material, such for instance as linen based formica or other plastic substance.

The paper prints as they travel upwardly between the final pair of belt-feeding units 3, see Fig. 5, from the wash tank 1 are guided over the top of the evener roll by means of metal guiding elements 8 in the form of thin plates or fingers arranged in spaced relation to each other and including downwardly depending portions 9 extending between the spaced belts and pulleys of the central belt-feeding unit 3 of the group into the path of the paper, the plates or fingers 8 being rigidly mounted on a supporting bar 10 extending across the machine and suitably attached at its ends to the frame of the machine. The prints are thus guided upwardly and directed through the curved path afforded between the outer periphery of the evener roll and the spaced curved parallel edges of the fingers 8, which cause the prints to follow over the evener roll and the latter during its engagement with the prints has the effect of smoothing them and removing any creases or wrinkles that may have developed during their travel through the processing tanks.

As the prints emerge from the top of the evener roll 6, they are engaged on their undersurfaces by dished bridge plates or fingers 11 which are arranged vertically in spaced relation, each with one end extending into a groove of the evener roll 6 to a point beneath the surface of the paper as it travels therearound, while the other ends of the bridge plates or fingers 11 extend to a point adjacent the entrance between wringer rolls including a smooth surfaced steel roll 12 and a contacting annularly grooved rubber roll 13, which extract the water from the paper prints without excessive pressure thereon, and the fingers or plates 11 afford a downwardly inclined bridge or supporting surface over which the prints slide from the evener roll to the wringer rolls. The bridge plates 11 are fixedly mounted on a supporting rod 14 that is suitably mounted at its ends on brackets carried by the supporting bar 10.

The wringer roll 13 is mounted on a rotating shaft 15 and is preferably formed of semi-hard rubber or other resilient or slightly yielding material which cooperates with the smooth surfaced steel roll 12 to remove surplus water from the paper prints as they are squeezed therebetween while traveling in a horizontal path, as appears in Fig. 5, and as the prints emerge from between the wringer rolls, they are suitably guided to a pair of belt-feeding units similar to those previously described, and which act to convey the prints to the drying mechanism.

To accomplish this, there are provided guiding fingers 16 arranged in spaced relation and attached to a supporting bar 17, which is suitably fastened at its ends to the frame of the machine. The fingers 16 at one end have portions which extend into the grooves formed in the rubber roll 13 and terminate at points above the upper surface of a paper print as it passes under the rubber roll, thus acting to deflect the paper from the wringer roll and carry it onward in a horizontal path, the paper being deflected from the metal roll 12 and guided therefrom by fingers 18 having terminal portions 19 that contact closely with the smooth surface of the metal roll and engage under the paper as it travels therearound, thus directing the paper into the guideway 21 formed between the fingers 16 and 18. The fingers 18 engaging the steel wringer roll 12 are carried by a supporting rod 22, see Fig. 6, mounted at its ends in bifurcated supporting brackets 23, the fingers being maintained in close contact with the wringer roll 12 by means of a spring 24 secured at one end, and fastened at its other end to an arm 25 carried by the supporting rod 22. The guiding fingers 16 also include downwardly depending portions 26, see Fig. 5, which extend between the spaced belts 27 and the pulleys on which they are mounted of the belt-feeding unit which cooperates with the belts 28 of an adjacent belt-feeding unit similarly constructed, to conduct the prints to the drying means. Thus the fingers 16 and 18 guide the prints therebetween through the guideway 21 in a horizontal path and then deflect the prints downwardly over the upper portions of the endless belts 28, and between the belts 27 and 28, which carry the prints thence in a downward path to a point where they enter the drying means. At the bottoms of the belts 27 and 28, the prints are deflected laterally and downwardly by guiding fingers 29, see Figs. 3 and 4, which are mounted on a supporting bar 31 suitably secured at its ends to the belt-feeding unit carrying the belts 28, the prints being thus deflected into the drying mechanism which will now be described.

It is important that the prints be fed into and carried through the drier as fast as they are conducted from the processing mechanism, also that they be dried gradually and uniformly by mechanism that permits subjecting them to a lower temperature when they first enter the drier and are in the state of maximum moisture content, and to a higher temperature after the moisture content is reduced, so as to insure smoothness and uniformity in the print when in a completely dry state, and to accomplish these results with drying mechanism requiring as little floor space as possible, having maximum capacity, and which is comparatively simple to operate and service.

To accomplish these ends, there are employed two superposed rotatable heated drums, a lower drum 32 and an upper drum 33, constructed preferably of aluminum or other suitable metal and mounted for rotation on suitable supporting journals. The heating drums 32 and 33 are provided interiorly with heating units, not shown, which may be electrical, gas-fired, or otherwise, and are independently controlled so as to enable having a lower temperature in drum 32 and a higher temperature in drum 33.

The prints are carried around the drums by means of an endless drum conveyor belt 34 of canvas or other suitable material, which travels around the roll 35 located adjacent to the inlet point of the lower drum 32, thence around the lower drum in a clockwise direction, referring to Fig. 3, thence around roll 36 and vertically to and around roll 37, located adjacent to the inlet point of the upper drum 33, thence around the upper drum 33, roll 38, the adjustable tension roll 39, guide rolls 40, 41, and 42, and back to the first mentioned roll 35. Thus both heating drums and the belt 34 when in contact therewith travel in a clockwise direction with reference to Fig. 3, and the prints, deflected by fingers 29, enter and travel downwardly between the belt 34 and the lower drum 32, thence around the drum and roll 36, thence upwardly in a vertical path to and around roll 37, thence downwardly between the upper drum 33 and the belt 34, and thence outwardly in a lateral direction under roll 38 on to a suitable platform 43 from which the prints are discharged on to the cover or table 44.

As the prints leave the lower heating drum 32, it is necessary to deflect and guide them from a downward path to a vertical path upwardly, and this is accomplished by the deflecting and guiding means illustrated in Fig. 4, consisting of spaced spring fingers 45 engaging the periphery of the lower heating drum 32 and acting to deflect the prints from the drum laterally, so that they follow the belt 34 around roll 36, whence they are guided between belt 34 and the belts 27 of the adjacent feeding unit, which cooperate with belt 34 to carry the prints upwardly, and 46 designate a series of fingers with their ends extending between the adjacent belts 27 and having curved upper edges to direct the prints properly into their vertical path of travel. The spring fingers 45 and fingers or guides 46 are mounted on a suitable supporting bar 47 which is supported at its ends in suitable stationary brackets on the frame and removably held in place by pivoted keeper plates 48.

The prints are carried thence upwardly in a vertical path between the belt 34 and the belts 27 to the top of the vertical path, as shown in Figs. 3 and 5, where they are deflected in a clockwise direction, see Fig. 5, by fingers 49 mounted on a supporting cross-bar 51 suitably attached at its ends to the stationary frame of the machine. The fingers 49 extend between the adjacent belts 27 and their supporting pulleys to engage under the paper prints, and have curved edges 52 that guide the prints around the adjacent surface of the drum conveyor belt 34, deflecting them thence downwardly between drum conveyor belt 34 and the upper heating drum 33, around which they travel and from which they are discharged at the exit point beneath roll 38, see Fig. 3, on to the aforementioned platform 43.

The tension roll 39 over which the drum conveyor belt 34 travel is mounted in slotted bracket arms 53 and held in adjusted position therein by suitable fastening nuts 54, see Fig. 2, to impart the desired tightness to the drum conveyor belt, which is removable endwise from the rolls and drums for repair or servicing when required.

The parts are driven from an electric motor 55, see Fig. 1, which through a vertical shaft 56 and connecting gearing operates a horizontal drive shaft 57 that carries worms for operating worm gears on the several shafts of the belt-feeding units, in accordance with copending application Ser. No. 690,983, filed August 16, 1946, and the evener roll, wringer rolls, heating drums, and drum conveyor belt are operated from the drive shaft 57 in the following manner.

The final belt-feeding unit in the wash tank 1, see Fig. 6, includes an upper shaft 58 on which the belt-engaging pulleys are mounted and which is driven at one end by the shaft 57 already referred to, see Fig. 1, while at its opposite end said shaft 58 carries a gear 59 which operates a pinion 60 that in turn engages a gear 61 mounted on the shaft 7 which supports the evener roll, thus driving the evener roll in the same direction as shaft 58. The steel wringer roll 12 is mounted on a shaft carrying a worm gear at one end that is driven by a worm on the drive shaft 57, while at its opposite end said shaft is provided with a gear 62 that engages and drives a gear 63 on the shaft 15 on which the rubber wringer roll is mounted. The upper shafts of the belt-feeding units on which the belts 27 and 28 are supported are likewise provided with worm gears driven by worms on the drive shaft 57, which similarly operates shaft 64 on which the previously mentioned roll 37 is mounted. The shaft 64 is provided with a sprocket wheel 65 engaging and driving chain 66 which operates the sprocket 67 on the shaft carrying the aforementioned roll 38, and thus the rolls 37 and 38 are both positively driven in the same direction and impart corresponding movement to the drum conveyor belt 34 and to the heated rotating drums 32 and 33.

The belts 27 and 28 are actuated toward the drum conveyor belt 34 and toward each other respectively by spring followers 68, see Figs. 1, 2 and 5, in accordance with the disclosure of copending application Ser. No. 690,983, filed August 16, 1946.

With the mechanism described, prints are carried by the processing mechanism over the evener roll 6, thence between the wringer rolls 12 and 13 and downwardly between belts 27 and 28 of the belt-feeding units and into the inlet point of the lower drum, whence they travel in a clockwise direction with reference to Fig. 3 around the lower drum which is heated to a proper temperature to extract moisture gradually and slowly from the prints in their wettest state as they enter the drier. The prints travel thence from the lower drum in a vertical path to the inlet point of the upper drum and around the latter, which is heated to a greater degree than the lower drum, so as to remove effectively all remaining moisture from the paper, the prints being finally discharged on to the receiving platform at the exit point of the upper drum beneath the roll 38.

With this arrangement, drying can be effected at a maximum speed with relatively small drums superposed one above the other occupying a minimum floor space, and the drying effect on the paper can be effectively and accurately controlled so as to increase the degree of heat imparted as the moisture content is reduced and prevent excess of heat when the paper is in its wettest state, resulting in a machine of maximum capacity capable of producing prints at a fast rate and which are of high quality, free of wrinkles, creases or other imperfections due to improperly controlled drying or irregular movements of the prints through the drying mechanism.

While the invention has been described in connection with the particular mechanism herein shown, it is not confined to the exact structure and arrangement disclosed, and this application is intended to cover such modifications or departures as may come within the purposes of the invention and the scope of the following claims.

We claim:

1. Print drying means including a plurality of superposed rotatable heated drums, an endless drum conveyor belt extending around substantially the entire peripheries of both said drums successively and between said drums in a vertical plane substantially tangential to the periphery of the lower drum, said belt acting to convey prints successively around the lower and upper drums, vertically arranged instrumentalities located above and adjacent to the outlet point between said drum conveyor belt and the lower drum and operating to move prints upwardly from the lower drum to the upper drum, stationary guiding means arranged adjacent to the drum conveyor belt at the outlet point of the lower drum acting to guide prints from the lower drum to a point between the drum conveyor belt and said vertically arranged instrumentalities, and stationary guiding means arranged adjacent to the drum conveyor belt at the inlet point to said upper drum and acting to guide prints from between the drum conveyor belt and said vertically arranged instrumentalities to a point between the drum conveyor belt and said upper drum.

2. Print drying means including a plurality of superposed independently heated rotatable drums, an endless drum conveyor belt extending around substantially the entire peripheries of both said drums successively and between said drums in a vertical plane substantially tangential to the periphery of the lower drum, the drum conveyor belt acting to convey prints around the lower and upper drums successively, said drum conveyor belt affording inlet and exit points spaced from each other vertically around said drums, vertically arranged feeding means located adjacent to the vertical portion of said drum conveyor belt between the drums and acting to move prints upwardly from the lower drum to the upper drum, stationary guiding means arranged adjacent to the drum conveyor belt at the outlet point of the lower drum acting to guide prints from the lower drum to a point between the drum conveyor belt and said vertically arranged feeding means, and stationary guiding means arranged adjacent to the drum conveyor belt at the inlet point of said upper drum acting to guide prints from between the drum conveyor belt and said vertically arranged feeding means to a point between the drum conveyor belt and said upper drum.

3. Print drying means including a plurality of superposed rotatable heated drums, an endless drum conveyor belt extending around substantially the entire periphery of the lower drum, thence from a point adjacent to the periphery of the lower drum in a vertical direction to a point adjacent to the periphery of the upper drum, thence around substantially the entire periphery of the upper drum and from a point adjacent to the periphery thereof to the inlet point of the lower drum, vertically arranged instrumentalities located adjacent to a plane tangential to the lower drum and acting to move prints upwardly from the lower drum to the upper drum, stationary guiding means arranged adjacent to the drum conveyor belt at the outlet point of the lower drum acting to guide prints from the lower drum to a point between the drum conveyor belt and said vertically arranged instrumentalities, and stationary guiding means arranged adjacent to the drum conveyor belt at the inlet point to said upper drum acting to guide prints from between the drum conveyor belt and said vertically arranged instrumentalities to a point between the drum conveyor belt and said upper drum.

4. Print drying means including a plurality of superposed rotatable heated drums, an endless drum conveyor belt extending around substantially the entire periphery of the lower drum and thence in a vertical path substantially tangential to the lower drum to a point adjacent the periphery of the upper drum, thence around substantially the entire periphery of the upper drum and from the exit point of the upper drum to the inlet point of the lower drum, rolls supporting the drum conveyor belt, driving means for one of said rolls, and a pair of belt-feeding units located adjacent to said vertical path of the drum conveyor belt with their lower ends adjacent to the inlet point between the conveyor belt and the lower drum, said pair of belt-feeding units acting to feed prints therebetween downwardly to the inlet point of the lower drum and one of said belt-feeding units cooperating with the drum conveyor belt to feed prints from the exit point of the lower drum upwardly to the inlet point of the upper drum.

5. Print drying means including a plurality of superposed rotatable heated drums, an endless drum conveyor belt extending in the same direction around substantially the entire peripheries of both drums and through a vertical path substantially tangential to the lower drum from the exit point of the lower drum to the inlet point of the upper drum, thence around the upper drum and through a return path from the exit point of the upper drum to the inlet point of the lower drum, supporting rolls for the drum conveyor belt, driving means for one of the supporting rolls, said belt affording symmetrically arranged inlet and outlet points for the drums, a pair of belt-feeding units arranged vertically adjacent to said vertical path of the drum conveyor belt immediately above and adjacent to the inlet point between said belt and the lower drum, said belt-feeding units acting to convey prints therebetween downwardly to the inlet point of the lower drum and one of said belt-feeding units cooperating with the drum conveyor belt to convey the prints upwardly from the exit point of the lower drum to the inlet point of the upper drum, deflecting means at the bottom of said belt-feeding units acting to guide prints from therebetween to a point between the lower drum and the drum conveyor belt, and deflecting means located at the exit point of the lower drum and acting to guide prints from said exit point upwardly between the vertical portion of the drum conveyor belt and the belts of the adjacent belt-feeding unit.

6. The combination with processing mechanism of a photocopy machine, of print drying means including a plurality of superposed rotatable heated drums, an endless drum conveyor belt extending between and around the peripheries of both said drums, an evener roll located above and adjacent to the processing mechanism, said evener roll having a print supporting periphery over which the prints travel upon moving upwardly from the processing mechanism and annular grooves in said periphery located beneath the prints as the latter travel thereover and acting to remove creases in the prints as they travel over said periphery, guiding means located between the processing mechanism and the evener roll acting to guide prints from the processing mechanism to the evener roll, wringer rolls arranged to one side of the evener roll and between the evener roll and the drum conveyor belt, bridge fingers located between the evener roll and wringer rolls over which the prints travel from the evener roll to the wringer rolls, and guiding and conveying devices between the wringer rolls and the drum conveyor belt.

7. The combination with processing mechanism of a photocopy machine, of print drying means including a plurality of superposed rotatable heated drums, an endless drum conveyor belt extending between and around the peripheries of both said drums, an evener roll located above and adjacent to the processing mechanism between the conveyor belt and the processing mechanism, said evener roll having a print supporting periphery over which the prints travel upon moving upwardly from the processing mechanism and annular grooves in said periphery located beneath the prints as the latter travel thereover acting to remove creases in the prints as they travel over said periphery, guiding means located between the processing mechanism and the evener roll acting to guide prints from the processing mechanism to the evener roll, surplus liquid removing means between the evener roll and the conveyor belt, and bridge fingers located adjacent to the evener roll and over which the prints travel therefrom to the surplus liquid removing means.

8. The combination with processing mechanism of a photocopy machine, of print drying means including a plurality of superposed rotatable drums, an endless drum conveyor belt extending around substantially the entire peripheries of both said drums and movable through a vertical path substantially tangential to the lower drum from the exit point of the lower drum to the inlet point of the upper drum, a pair of belt-feeding units located adjacent to the vertical path of said drum conveyor belt adjacent to and immediately above the inlet point between said conveyor belt and the lower drum, said belt-feeding units cooperating to feed prints downwardly therebetween to the inlet point of the lower drum and one of said belt-feeding units cooperating with the drum conveyor belt to convey the prints upwardly from the exit point of the lower drum to the inlet point of the upper drum, an annularly grooved evener roll located above and adjacent to the processing mechanism and over which the prints travel upon moving upwardly from the processing mechanism, wringer rolls arranged to one side of the evener roll and between the evener roll and said belt-feeding units, bridge members extending from the evener roll to the wringer rolls and acting to support the prints as they travel therebetween, and guiding and supporting means extending from the wringer rolls to said belt-feeding units and acting to convey the prints from the wringer rolls to the belt-feeding units.

EDWARD R. SABEL.
FRANK I. GALBRECHT.

REFERENCES CITED

The following references are of record in the file of this patent:

UNITED STATES PATENTS

| Number | Name | Date |
|---|---|---|
| 46,026 | Rogers | Jan. 24, 1865 |
| 1,260,595 | Thompson | Mar. 26, 1918 |
| 1,457,451 | Morgan | June 5, 1923 |
| 1,768,501 | Beidler | June 24, 1930 |
| 1,852,662 | Lord | Apr. 5, 1932 |
| 1,894,092 | Greene | Jan. 10, 1933 |
| 2,060,286 | Doetzel | Nov. 10, 1936 |
| 2,265,975 | Lloyd | Dec. 9, 1941 |
| 2,347,189 | Garraway | Apr. 25, 1944 |